E. DRAULLETTE.
VARIABLE SPEED DEVICE.
APPLICATION FILED MAY 11, 1910.

1,031,988.

Patented July 9, 1912.
3 SHEETS—SHEET 1.

Witnesses:
Paul Dupuy
Victor Marendowski

Inventor:
Edmond Draullette

E. DRAULLETTE.
VARIABLE SPEED DEVICE.
APPLICATION FILED MAY 11, 1910.

1,031,988.

Patented July 9, 1912.
3 SHEETS—SHEET 2.

Witnesses:
Paul Rupey
Victor Marcendowski

Inventor:
Edmond Draullette

E. DRAULLETTE.
VARIABLE SPEED DEVICE.
APPLICATION FILED MAY 11, 1910.
1,031,988.
Patented July 9, 1912.
3 SHEETS—SHEET 3.
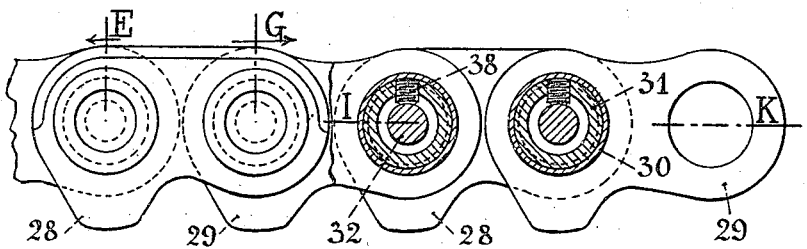
Fig. 3
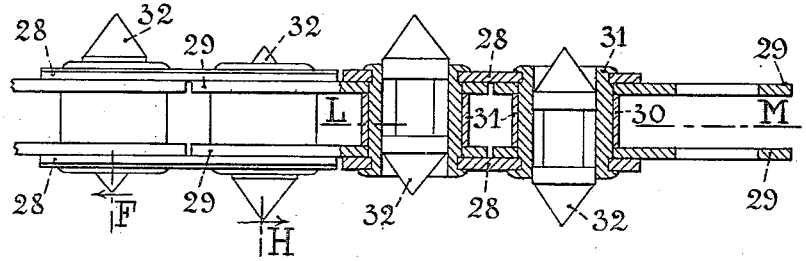
Fig. 4
Fig. 5  Fig. 6  Fig. 7  Fig. 8
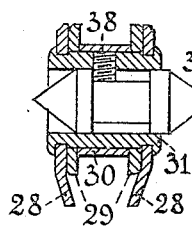 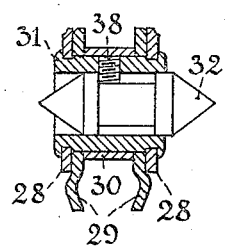 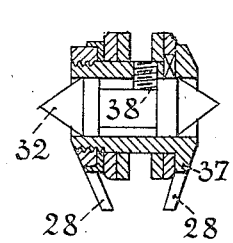 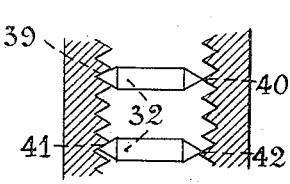
Fig. 9
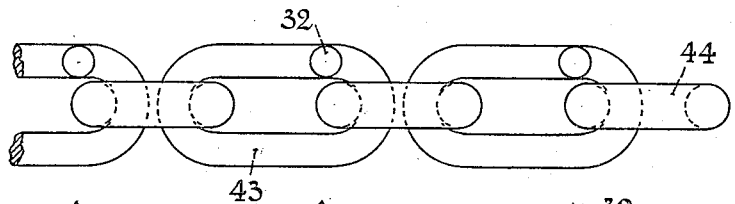
Fig. 10
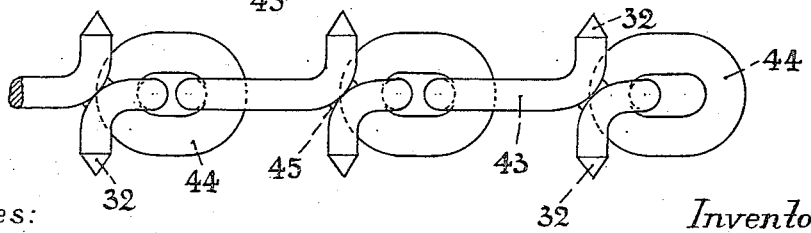
Witnesses:
Paul Aspey
Victor Marcinowski
Inventor:
Edmond Draullette

UNITED STATES PATENT OFFICE.

EDMOND DRAULLETTE, OF PARIS, FRANCE.

VARIABLE-SPEED DEVICE.

1,031,988.   Specification of Letters Patent.   Patented July 9, 1912.

Application filed May 11, 1910. Serial No. 560,757.

*To all whom it may concern:*

Be it known that I, EDMOND DRAULLETTE, a citizen of the French Republic, and resident of Paris, in the Republic of France, have invented new and useful Improvements in Variable-Speed Devices, of which the following is a specification.

This invention relates to a further improvement in variable speed devices as described and claimed in my application filed March 7, 1908 (Serial No. 419826) and it particularly concerns the extensible chain pulleys.

The description of the invention is given hereinafter with reference to the accompanying drawings, of which—

Figure 1:
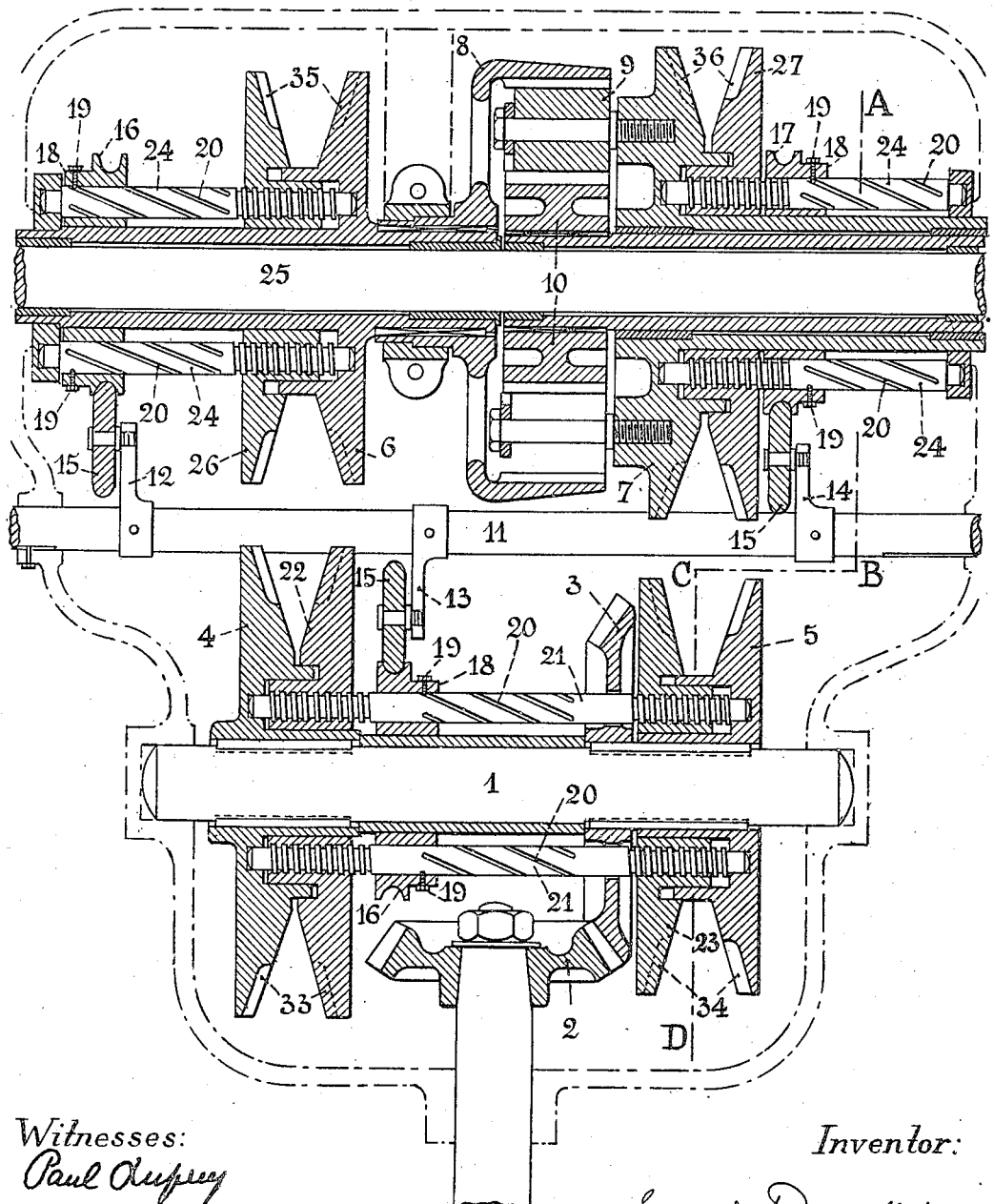
Figure 2:
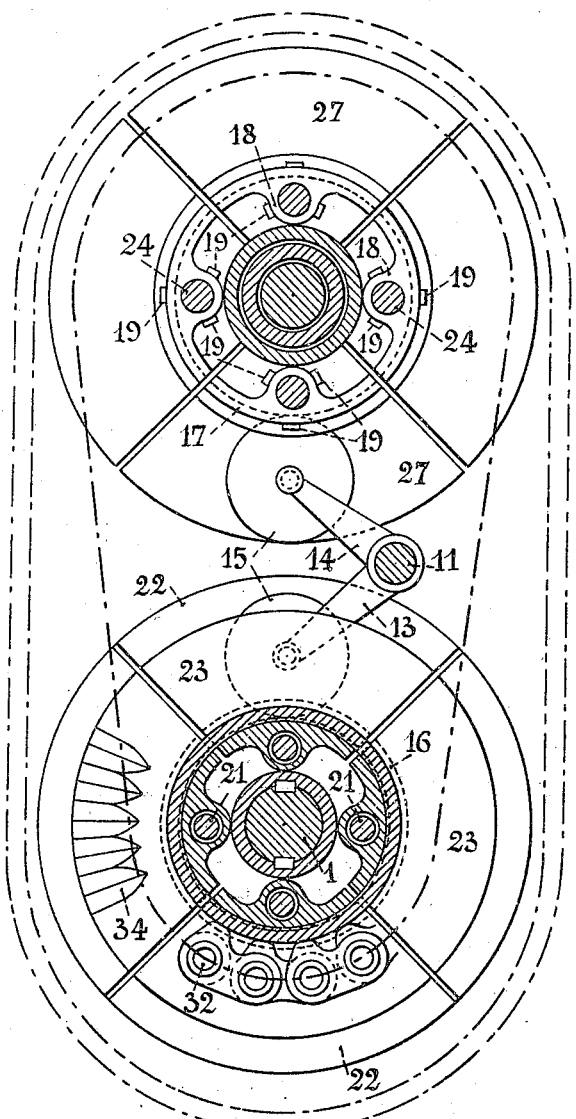

Figure 1 represents a section through the axis of the apparatus taken through the axis of the main shaft and of the secondary or auxiliary shaft. Fig. 2 is a section on line A—B and on line C—D of Fig. 1. Fig. 3 is an elevation, partly in section on line L—M of Fig. 4. Fig. 4 is a ground plan, partly in section, on line I—K of Fig. 3. Figs. 5 and 6 are side views of vertical sections through Figs. 3 and 4 on the lines E—F and G—H respectively looking in the direction of the arrows. Fig. 7 represents the junction of the chain. Fig. 8 represents a segmentary section of the groove of a chain disk showing the teeth and the positions of the center-punches. Figs. 9 and 10 represent in elevation and in ground plan a modification of the chain having fixed points.

The explosion engine revolving in one direction only and with uniform speed, an apparatus has to be added for obtaining a progressive speed and back-motion with the organs which are actuated from the main-shaft, said apparatus being hereinafter fully described.

The progressive variable speed gear is essentially composed of two principal parts of which the second one forms the object of the present invention, the first part being specifically described and claimed in my application (Serial No. 419826), namely:—
1.—a differential gear with straight pinions; 2.—a set of extensible pulleys which serve for the purpose of varying the relative speed of the outer toothed ring and of the satellites. One of these parts serves as an example of application for the other.

The main-shaft 1 receives a direct or conveniently reduced motion, as shown by way of example in the drawings, from the angular pinion 2 and through the intermediary of the wheel 3 which is keyed upon the shaft 1. There are further keyed upon said shaft 1 the driving pulleys 4 and 5 to which correspond two other pulleys 6 and 7 actuated by chains, cables or any other suitable means for transmission and revolving in the same direction as the main-shaft. Owing to a device which is described hereinafter, said pulleys may vary their diameter as they are composed of a fixed hub and of a movable part.

Supposing the motion to start originally from the position of the wheels which is shown in the drawings, the large driving pulley 4 operates the small pulley 6 which has, keyed upon its fixed hub, the outer ring 8 of the differential gear; the small driving pulley 5 operates the large pulley 7 which takes along in its revolving motion the satellite pinions 9 and as in the case presented the angular speeds of the satellites 9 and of the ring 8 are unequal owing to the diameters of the driven pulleys, the central pinion 10 will be moved inversely owing to the properties of the differential motion, the diameters of the pulleys corresponding to the result to be attained upon the inner shaft being determined by calculation. Supposing this position were the position of high back speed—when now the driving rod 11 with the pushing levers 12, 13, 14, each of which is provided with a roller 15, is moved from the left to the right, the rings having grooves 16, 17, are displaced in the same direction on the fixed hubs of the pulleys.

Let us consider for example the movement of ring 16 on the main-shaft 1, said ring being divided into four sectors, each of which is provided with a projection 18 serving as a screw owing to three screws 19 mounted in the same. The flattened ends of the three screws 19 slide in helicoidal grooves 20 of very high pitch arranged on the rod 21 which is located with its ends in the hubs 4 and 5 so that it can freely revolve under the action of the screws 19 acting in the grooves 20.

Each part of the operating ring 16 actuates one rod 21 revolving the same by means of the screws 19 mounted in the projection 18. Each rod 21 is threaded at both ends at the same pitch and screwed into the movable sectors 22 and 23 of the driving pulleys 4 and 5 so that, if the screw is turned, the helicoidal threads being right hand threads, sector 23 will move toward the hub 5. A similar motion will be imparted to the other rods 21 whereby the pulley 4, for example, will reduce or diminish its diameter while the pulley 5 augments its diameter.

The rings 16, 17 for the driven pulleys act in a similar manner and simultaneously by means of the rods 24 which have helicoidal grooves as described with reference to the rod 21. The ends of each rod 24 are also pivoted in fixed bearings and one end is screw threaded to engage with one of the movable sectors, 26 for example, of the driven pulley 6 and this sector will be displaced through the revolving motion imparted to rod 24 by the screws 19 acting in the grooves 20.

The displacement of the sectors on the inner shaft 25 takes place in inverse direction as the displacement produced on the main shaft:—while the pulley 6 which is operated from the pulley 4 increases its diameter, the diameter of the pulley 7 which is operated from the pulley 5 decreases. The speed of the outer ring 8 decreases, and the speed of the pinions 9 increases and the difference of speed of the two parts 8 and 9 from a maximal speed, which for a motorcar will be the high back speed for example, will become zero after having passed through such a value that the movement obtained upon the central pinion 10 is equal to zero and then will gradually increase as a forward motion. Thus, for this pinion 10 the following phases are obtained:—1.—high back speed gradually decreasing to zero, 2.—progressive forward motion up to the desired maximal speed, obtained when the satellites and the ring revolve at the same speed, that is to say, when the four pulleys are of equal diameter.

For obtaining the forward and backward movement of the sectors 22, 23, 26 and 27 with regard to their fixed hubs, that is to say, the variation of the speed in forward and in backward direction and the stopping of the car, any suitable means operated by hand or foot may be used as well as any suitable devices which are automatically actuated from the engine.

The apparatus being in motion, each sector of the operating rings 16, 17 will, in its turn, come into the way of the rollers 15 if a certain pressure is exerted upon said rollers through the intermediary of the lever-supports 12, 13 and 14 and the rod 11. According to the rapidity of rotation each sector will be removed laterally and for a small distance so that the next following sector can in its turn take part in this motion. As the device is operated in the precise moment where the movable sectors of the operating pulleys are not in engagement with the chain, there will be required only very little effort for operating the device, which thus is easy to manipulate, the gear being adapted to pass in comparatively short time through all the different positions.

The chains which are used with the pulleys may be of any suitable construction. It is however preferable to use chains with fixed or movable cross pins which are constructed in the manner hereinafter described and which correspond to the angular teeth of the pulleys.

The chain which is shown in Figs. 3, 4, 5, 6, and 7 is composed of stamped links 28, 29 which are both, the outer links 28 as well as the inner links 29 traversed by a tube 30 and connected by a tubular axle 31 in which the cross pin 32 is located so that it can be shifted in said tubular axle from one side to the other to penetrate with the one or with the other pointed end between the angular teeth of the sectors 33, 34, 35, 36 of the pulleys to take the same along (Figs. 1, 2 and 8).

The junction of the chain links is effected by means of a hollow bolt 37 (Fig. 7) in which a cross pin is movably mounted. The lateral displacement of said cross bolt or pin is limited by means of the abutment screw 38 in tube 31.

In order to bring the cross pins or bolts 39, 40 to the intermediate positions 41, 42 the teeth of the pulleys are arranged so that the teeth on the one side stand opposite the spaces or intervals between the teeth of the other side; the chain can thus work under the best possible conditions (Fig. 8).

In lieu of the movable cross pins or bolts the chain may have fixed lateral arms and be composed of special links 43 connected the one with the others by means of ordinary chain links 44 (Figs. 9 and 10). The ends of the rods which form the special links are bent and soldered at 45 so that they form points 32 at the sides which are similar to the pointed ends of the movable cross bolts hereinbefore described, said fixed points engaging automatically with the angular teeth of the pulley sectors.

It is obvious that the pulleys and chains hereinbefore described can be applied not only to variable speed devices with differential gears but to any speed gear of known construction.

The apparatus is applicable in all industries where explosion engines are used, such as rolling bridges, hoists cranes, tool-engines, lifts, looms etc. but it is shown in the drawings in its application for motor-cars, the motor being arranged at the front end of the frame and connected with the variable speed gear by means of the shaft which operates the pinion 2. The central pinion 10 by its sleeve operates as usual another differential which transmits its motion to the chain pinions actuating the driving wheels by means of the shaft 25 connected with the said differential. The central pinion further may actuate the rear axle of the vehicle without the intermediary of chains.

I claim:—

1. A variable speed device comprising extensible chain pulleys and a chain comprising movable cross pins, the extensible pulleys having grooves which are provided with angular teeth in such a manner that the teeth of the one side stand opposite the intervals between the teeth of the other side in order to displace laterally the movable cross pins of the chain, their operativeness being thus insured for any intermediate position, and having movable cheeks divided into independent sectors adapted to displace themselves laterally upon the hub of the fixed part of the respective pulley, and screws mounted in each of said movable sectors of the pulleys for varying the width of the grooves, said variations of the groove and said lateral displacement of the sectors being effected successively and when the sectors are not in gear with the chain for avoiding the effects of the pull of the driving chain, substantially as described and shown and for the purpose set forth.

2. In a variable speed device comprising extensible chain pulleys with movable sectors, the means for the lateral displacement of said movable sectors comprising double screws abutting against the fixed parts of the pulleys and having their threads directed in the same direction but said threads being of different pitch, auxiliary grooved rings or pulleys equally divided into independent sectors which each have points forming a female screw serving for turning said double screws, a driving rod and rollers carried by said driving rod and rolling in the grooves of the auxiliary pulleys for displacing laterally and successively the sectors of the extensible pulleys and for varying the widths of the grooves in the pulleys when said sectors are not in gear with the chain, substantially as described and shown and for the purpose set forth.

3. In a variable speed device comprising extensible chain pulleys, the combination of the extensible pulleys having angular teeth with means for drawing along consisting of an articulated chain of metal, composed of links which have lateral cheeks serving for guiding and supporting the chain in the grooves of the pulleys, and pointed arms of said links which engage with the teeth of the grooves of the extensible pulleys for producing without any slipping the drawing along of said pulleys, substantially as described and shown and for the purpose set forth.

EDMOND DRAULLETTE.

Witnesses:
 PAUL DUPUY,
 VICTOR MARENDOWSKI.